UNITED STATES PATENT OFFICE.

WALTER MIEG, OF ELBERFELD, GERMANY, ASSIGNOR TO FARBENFABRIKEN VORM. FRIEDR. BAYER & CO., OF ELBERFELD, GERMANY, A CORPORATION OF GERMANY.

OLIVE-GRAY VAT DYE.

996,109.  Specification of Letters Patent.  Patented June 27, 1911.

No Drawing.  Application filed January 24, 1911.  Serial No. 604,437.

*To all whom it may concern:*

Be it known that I, WALTER MIEG, doctor of philosophy, chemist, citizen of the German Empire, residing at Elberfeld, Germany, have invented new and useful Improvements in Olive-Gray Vat Dye, of which the following is a specification.

The present invention relates to the manufacture and production of a new vat dye which dyes cotton from an alkaline hydrosulfite vat fast olive-gray shades.

The process for producing the new dye consists in treating dibenzoyl-para-para¹-diamino-alpha-alpha'-dianthrimid, (produced by condensing 1-benzoylamino-4-chloroanthraquinon with monobenzoyl-1.4-diaminoanthraquinon according to U. S. Letters Patent No. 971,224), with concentrated sulfuric acid. The process proceeds most probably according to the following equation:

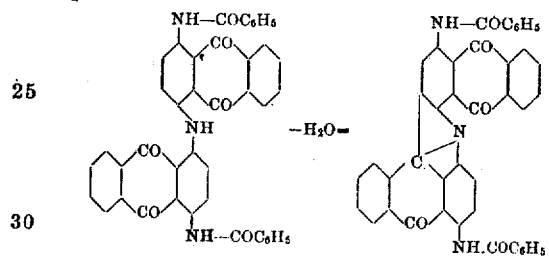

In order to illustrate the new process more fully the following example is given, the parts being by weight:—1 part of dibenzoyl-para-para¹-diamino-alpha-alpha'-dianthrimid (produced by condensing 1-benzoylamino-4-chloroanthraquinon with monobenzoyl-1.4-diaminoanthraquinon according to British Letters Patent No. 25986/09) is heated while stirring with 10 parts of sulfuric acid (66° Bé.) to 30–35° C. until the mass has assumed a brown coloration. 10 parts of a 40 per cent. fuming sulfuric acid are then added and the mixture is poured on ice. The dye separates in the shape of olive-green flakes, it is filtered off and washed with water. It is a dark powder which is soluble in concentrated sulfuric acid with a cherry red color and only difficulty soluble in a boiling organic solvent, such as quinolin with an olive-green coloration.

I claim:—

The herein described new dye having probably the formula:

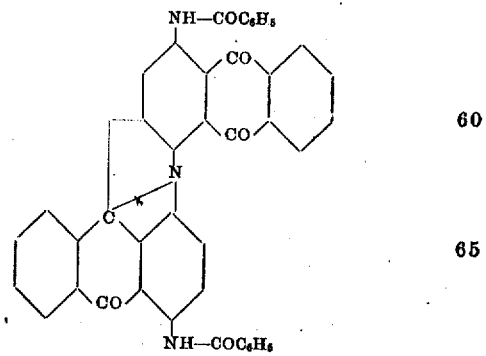

which dye is after being dried and pulverized a dark powder soluble in concentrated sulfuric acid with a cherry red coloration; and dyeing cotton from an alkaline hydrosulfite vat fast olive-gray shades, substantially as described.

In testimony whereof I have hereunto set my hand in the presence of two subscribing witnesses.

WALTER MIEG. [L. S.]

Witnesses:
 CHAS. J. WRIGHT,
 ALFRED HENKEL.